United States Patent [19]

Suda et al.

[11] 3,911,030

[45] Oct. 7, 1975

[54] PROCESS FOR THE SEPARATION OF RESORCINOL AND HYDROQUINONE FROM THEIR ADMIXTURE

[75] Inventors: Hideaki Suda, Takaishi; Iwao Dohgane, Nishinomiya; Takashi Chinuki, Toyonaka; Kenji Tanimoto; Hirokazu Hosaka, both of Minoo; Kazunari Ebara, Takarazuka; Yukimichi Nakao, Kobe; Yuji Ueda, Izumiotsu; Seiya Imada, Sakai; Minoru Yasuda, Osaka, all of Japan

[73] Assignee: Sumitomo Chemical Company, Limited, Osaka, Japan

[22] Filed: June 15, 1973

[21] Appl. No.: 370,362

[30] Foreign Application Priority Data
June 20, 1972 Japan.................... 47-62046

[52] U.S. Cl.................. 260/621 B; 260/621 A
[51] Int. Cl.$^2$............................... C07C 37/24
[58] Field of Search ............... 260/621 A, 621 B

[56] References Cited
UNITED STATES PATENTS
1,446,550   2/1923   Dissoway.................... 260/621 B

OTHER PUBLICATIONS

"Dict. of Org. Comp.," Vol. 5, pp. 2839 and 2857, (1965).
Kuk et al., "Enc. of Chem. Tech.," Vol. 11, pp. 472, 473, 483, (1967).

Primary Examiner—Norman Morgenstern
Attorney, Agent, or Firm—Stevens, Davis, Miller & Mosher

[57] ABSTRACT

A mixture containing resorcinol and hydroquinone is separated efficiently into resorcinol and hydroquinone by mixing the mixture with a particular organic solvent such as esters, ethers, alcohols or vinyl group-containing compounds, and separating the resulting slurry mixture into precipitated hydroquinone and resorcinol solution.

5 Claims, No Drawings

PROCESS FOR THE SEPARATION OF RESORCINOL AND HYDROQUINONE FROM THEIR ADMIXTURE

The present invention relates to a process for separating resorcinol and hydroquinone characterized in that a mixture thereof is treated in the presence of particular solvents.

According to the present invention, there is provided a very simple and effective process for separating resorcinol and hydroquinone in a pure form from a mixture of any ratio of the two compounds.

The two compounds have so far been obtained separately either from natural sources or by synthesis, and so almost no investigation into the separation of the mixtures into each of the individual two components has been made. Generally it is considered that the separation seems possible by distillation, sublimation, crystallization and the like, but it is practically nearly impossible. Referring to distillation processes, they have boiling points close to each other, i.e., resorcinol 280°C, and hydroquinone 285°C, and in addition they have each a high sublimation property, and therefore they can not substantially be separated in a pure form from each other by distillation.

Referring to sublimation processes, whether or not the separation is possible depends upon a proportion of resorcinol to hydroquinone in the mixture, for example when the mixture has a relatively high hydroquinone content, pure hydroquinone alone can be isolated, and when it has a relatively low hydroquinone content, pure hydroquinone can not be isolated. On the other hand, as is well known, when resorcinol is isolated by this process, an upper limit of purity thereof is at best 85%.

As for crystallization, either of the two can be isolated in a pure form as the mixture has an eutectic point, however it is impossible from physical laws to isolate both of them in a pure form.

As described above, a satisfactory separation process has not been established, because the need for separation has not been so large and at the same time the separation by conventional processes has been considered to be impossible or has not been carried out sufficiently.

However, recent advances and developments in synthetic methods have made it possible to produce the so-called hydroxy compounds such as resorcinol and hydroquinone at the same time, and whether or not the production thereof on industrial scale is possible has exclusively depended upon development of the separation techniques. The inventors have made extensive studies on processes which are capable of isolating pure resorcinol and pure hydroquinone separately from the mixtures of any ratio of the two, and found that some particular solvents have an effect of extracting resorcinol selectively, when added to the mixtures.

In this way, the inventors discovered that the two compounds can be separated from each other in a pure form by adding a particular solvent to the mixture, each component of which being a solid at around room temperature, whereby one of the components is caused to stay in a solid phase and the other is caused to pass into a liquid phase, and then by separating the two phases from each other by, e.g., filtration.

Thus, the present invention is to provide a process for the separation of resorcinol and hydroquinone, which comprises mixing a mixture containing resorcinol and hydroquinone with a member, which is capable of dissolving resorcinol and not capable of dissolving hydroquinone, selected from the group consisting of esters, vinyl group-containing compounds, aromatic ethers, alcohols and cyclic ethers, and separating the resulting slurry mixture into precipitated hydroquinone and resorcinol solution.

The most important points of the process of the present invention consist in dividing the mixture into two phases by adding a particular solvent, and separating the two phases. This means that the behaviour of a ternary system of resorcinol-hydroquinone-solvent can not be estimated from the physical properties alone of a binary system of solvent-resorcinol or solvent-hydroquinone. For example, referring to water, 100 g of water dissolves at 30°C therein, as is well known, about 230 g of resorcinol or about 6 g of hydroquinone. Consequently, from the solubilities in water of the two compounds, it might easily be seen that the separation is very simple based on the solubility difference between them. In practice, however, the behavior of a ternary system of resorcinol-hydroquinone-water are so different from those in binary systems, so that this ternary system can not be applied to the separation of the two compounds from each other. That is to say, if the separation were tried on a ternary system consisting of the two compounds and water, it would only show a very poor efficiency, because compatibility between the two compounds increases the solubility of hydroquinone in water. Furthermore this ternary system has an eutectic point at a ratio of 8:2 of resorcinol to hydroquinone, which makes impossible a complete separation of the two. As can be seen from the above, solvents which can effectively be applied to the separation are such that they can be discovered not from the physical properties of the binary systems, but from a factual investigation on numerous kinds of solvents.

Therefore it has so far been considered impossible to completely separate a mixture of isomers, e.g., resorcinol and hydroquinone, into the individual pure components by solvent extraction. In this respect, the present invention should be regarded as extremely important in altering the conventional view.

Substances herein referred to as particular solvents have a freezing point of below 110°C and dissolve resorcinol very well but not or only a little hydroquinone therein and concretely include acid esters including ethylacetate, methylbenzoate and diethylisophthalate; vinyl group-containing compounds including acrylonitrile, acrylic acid and methyl acrylate; aromatic ethers including anisole and methylanisole; alcohols including methylalcohol and ethylalcohol; and cyclic ethers including tetrahydrofuran and dioxane.

These particular solvents alone show, of course, a good separation capacity in a ternary system of resorcinol-hydroquinone-solvent, and a combination of said solvents also shows a good separation capacity.

According to the present invention, even a mixture which contains the two components in such a ratio that none of them can be separated from each other completely by distillation, sublimation or crystallization, namely a mixture very close to an eutectic mixture which contains resorcinol and hydroquinone in a ratio of 80:20, can be separated from each other by such a procedure where a solvent is added to the above mixture in an amount of one-tenth to 30 times by weight, generally one-third to 3 times by weight based on the mixture, and then the resulting mixture is heat-treated while stirring at −20° to 110°C, preferably −10° to 90°C. Thereafter the resulting slurry is subjected to, e.g., a centrifugation or suction-filtration to obtain crystals containing more hydroquinone than the initial mixture and a filtrate containing more resorcinol.

The purity of resorcinol or hydroquinone may be further increased, if necessary, to a required level by conventional processes, e.g., crystallization, or by repeating the previously described procedure with the same or different solvents.

When the same procedure is to be repeated in order to increase the purity, some solvents other than the above-mentioned solvents have been found to be more suitable for carrying out the separation efficiently. They are water and ketones including acetone, methylethylketone and methylisobutylketone. When the procedure is repeated with the same solvents by altering the treatment temperature, the amount of solvents used and others, dioxane and methanol are particularly preferable to be used. The advantages of the two solvents are considered to be due to their capacity for forming an adduct with hydroquinone unlike other solvents. Methanol is well known to form the adduct, however it is a new fact that was first discovered and confirmed by the inventors that dioxane is also capable of forming the adduct. Consequently, the inventors were the first to apply the capability of dioxane or methanol to form a hydroquinone adduct to the separation of resorcinol from hydroquinone. Thus, whether or not solvents are to be used separately or in combination can be determined according to the circumstances.

Furthermore, the present invention also provides a process for separating hydroquinone and resorcinol from a mixture containing the two compounds and high-boiling tarry matters, which comprises distilling the mixture together with the aforesaid particular solvent under intimate contact with vapourized resorcinol, hydroquinone and the solvent, and then separating the resulting distillate into resorcinol and hydroquinone.

Although an industrial separation and purification of mixtures containing high-melting substances have so far been carried out by rectification, the components solidify in a condensation step due to their high melting points, thereby giving a serious drawback to the rectification process.

Also in separation by distillation of mixtures of resorcinol and hydroquinone, vaporized hydroquinone and resorcinol are cooled in a condenser to form solid crystals due to their high sublimation property and high melting points (resorcinol 110°C, hydroquinone 170°C), and therefore the crystals plug the condenser and lower the cooling efficiency unless they are removed constantly therefrom, and making impossible a normal operation.

However, the inventors have found that a mixture of the two compounds can be separated into the two in a highly pure form without the above difficulty by distilling the mixture together with the aforesaid particular solvent under such a condition that the vapours of the three may be brought into intimate contact, and then treating the resulting distillate according to the procedure above described. According to the process of the invention, the distillate does not solidify in a condenser, remaining as liquid, unlike conventional distillation, thereby causing no problems such as sticking to or plugging of condenser, and may be treated as it is according to the process of the invention to separate it into resorcinol and hydroquinone.

A simultaneous production process of resorcinol and hydroquinone inevitably gives a considerable amount of high-boiling point by-products (hereinafter referred to as a tarry matter). Therefore it can be said that the process of the present invention is much superior as a separation process by the distillation of a resorcinol-hydroquinone mixture which contains tarry matter.

The present distillation method will further be illustrated hereinafter.

A mixture containing resorcinol, hydroquinone and high-boiling tarry matters is charged in a distillation still equipped with a rectification column and heated to a boiling point, and then distilled under the controlled addition of the particular solvent. Solvent vapour generated is mixed with resorcinol and hydroquinone vapours and cooled in a condenser into a distillate which is then sent to a crystallization tank. The resulting distillate is cooled to obtain a slurry containing crystals of high hydroquinone-content, and then the slurry is separated into resorcinol and hydroquinone by the various procedures abovementioned including filtration and centrifugation. Recovered solvent can be reused as it is when its solid content is not so high. When the solid content has become so high as to make its reuse difficult, it may be regenerated by distillation. Furthermore a large amount of the mixture can be treated by a continuous operation where the mixture and the particular solvent are introduced quantitatively into a rectification column while high-boiling point residues are discharged from the bottom of column.

An amount of the particular solvent which is distilled out together with resorcinol, hydroquinone and high-boiling point tarry matters may be such that it permits the distillate to remain as liquid in a condensation step, and when the amount is in an excess or in defficiency of that required for the succeeding separation of resorcinol and hydroquinone, the solvent may be distilled off from or added to the distillate to adjust the amount thereof.

The present invention will be illustrated with reference to the following examples which are only illustrative but not limitative.

EXAMPLE 1

To 10 kg of a mixture containing resorcinol and hydroquinone in a ratio of 80:20 were added 10 kg of dioxane and the resulting mixture was stirred at 80°C. Then the resulting slurry was cooled to room temperature and was centrifuged to sufficiently remove the mother liquor. 3.5 Kilograms of crystals thus obtained contained resorcinol and hydroquinone in a weight ratio of 25:75. The crystals were further treated using 2 kg of dioxane similarly as described above to give 2.44 kg of crystals containing resorcinol and hydroquinone in a weight ratio of 2:98.

16.3 Kilograms of mother liquor first obtained contained resorcinol and hydroquinone in a weight ratio of 95:5. By a simple distillation of the mother liquor, 6 kg of dioxane were recovered. The residual solution was cooled to 20°C to separate out crystals which were then centrifuged to obtain 4.94 kg of crystals containing resorcinol and hydroquinone in a weight ratio of 98:2.

Combined filtrates from the resorcinol portion and the hydroquinone portion reached 3.66 kg and contained resorcinol and hydroquinone in a weight ratio of 80:20. The filtrate could completely be separated into the two by repeating the series of procedures above-mentioned.

EXAMPLE 2

To 10.0 kg of a mixture of 5.0 kg of resorcinol and 5.0 kg of hydroquinone were added 8 kg of ethylacetate and the resulting mixture was stirred at 0°C. The resulting slurry was centrifuged at 0°C to give 4.70 kg of crystals containing 0.09 kg of resorcinol, 4.40 kg of hydroquinone and 0.21 kg of ethylacetate, and 13.10 kg of a mother liquor containing 4.91 kg of resorcinol, 0.60 kg of hydroquinone and 7.59 kg of ethylacetate. The mother liquor was evaporated to a dry state to recover 7.50 kg of ethylacetate. To 5.51 kg of crystals thus obtained was added 0.83 kg of water, and the mixture was stirred at 60°C until a completely uniform solution was obtained and then cooled to room temperature. The resulting slurry was filtered to give 2.85 kg of white needle-like crystals containing 2.70 kg of resorcinol, 0.05 kg of hydroquinone and 0.10 kg of water.

EXAMPLE 3

To 10 kg of a mixture containing 2.0 kg of resorcinol and 8.0 kg of hydroquinone were added 5.0 kg of acrylonitrile and the resulting mixture was stirred at 10°C for 30 minutes to make a slurry which was then centrifuged to give 8.26 kg of crystals and 6.64 kg of filtrate. The crystals were dried to remove attached solvent, then 7.95 kg of hydroquinone of 98.7% in purity were obtained.

While the mother liquor was distilled to give 4.54 kg of recovered acrylonitrile and 2.16 kg of a residue which contained 1.91 kg of resorcinol, 0.20 kg of hydroquinone and 0.05 kg of acrylonitrile. Then 0.40 kg of methanol was added to the residue and the mixture was stirred at 60°C for 1 hour, then cooled to room temperature while stirring. The resulting slurry was filtered to give 1.1 kg of crystals which were then dried to give 1.06 kg of resorcinol of 99.1% purity. 1.38 Kilograms of the resulting mother liquor contained 0.86 kg of resorcinol and 0.19 kg of hydroquinone. The mother liquor could completely be separated into resorcinol and hydroquinone by repeating the same procedure.

EXAMPLE 4

To 10.0 kg of a mixture containing resorcinol and hydroquinone in a weight ratio of 70:30 were added 3.0 kg of methanol and the mixture was heated until a complete solution was obtained. Then the solution was cooled to 10°C to give a slurry which was then centrifuged to obtain 6.5 kg of crystals and 6.5 kg of filtrate. A weight ratio of resorcinol to hydroquinone in the crystals was 54.7:45.3, and the ratio in the mother liquor was 93:7.

Thereafter the filtrate was distilled to remove 0.8 kg of methanol therefrom and left standing at room temperature to separate out crystals. 1.42 kg of crystals obtained by filtration contained 98% of resorcinol. To 6.5 kg of crystals which had been first obtained were further added 5.0 kg of methanol and the mixture was treated similarly as described above to give 2.1 kg of crystals containing 94% of hydroquinone. The hydroquinone thus obtained became increasingly purer by repeating the methanol-treatment.

EXAMPLE 5

A mixture containing 580 g of resorcinol, 267 g of hydroquinone and 148 g of high-voiling tarry matter, which had been obtained from a cleavage product of diisopropylbenzene dihydroperoxide by distilling off low-boiling by-products such as acetone, was added in a distillation still equipped with a column packed with Dixon packing which has a capacity equivalent to 10 distillation trays, and then distilled while dioxane was continuously added. An amount of dioxane added was 210 g.

In this way, the distillation could be carried out without causing any trouble such as the separation of crystals from a distillate in a condenser.

The distillate was sent to a crystallization tank and additional dioxane was added thereto to obtain a mixture containing 550 g of resorcinol, 240 g of hydroquinone and 790 g of dioxane. The mixture could be separated into resorcinol and hydroquinone of a high purity by the procedure as described in Example 1.

EXAMPLE 6

A mixture containing 783 g of hydroquinone, 66 g of resorcinol and 143 g of high-boiling tarry matters was added in the same apparatus as in Example 5, and distilled while dioxane was introduced similarly as in Example 5. The amount of dioxane added was 210 g and the distillation could be carried out without any trouble. The distillate was led to a large adaptor, and cooled to separate out crystals which were then centrifuged, washed with water and dried. 727 Grams of hydroquinone of a high purity were obtained. The melting point was 170.3°C. A weight ratio of resorcinol to hydroquinone in the filtrate was 7:3. The filtrate was concentrated and treated according to the procedure as described in Example 1 to give resorcinol and hydroquinone of a high purity separated from each other.

EXAMPLE 7

A mixture containing 480 g of hydroquinone, 365 g of resorcinol and 138 g of high-boiling tarry matters was added in the same apparatus as in Example 5, and distilled while 420 g of butylacetate were continuously added. The resulting distillate was separated at 20°C into 451 g of hydroquinone crystals of 94.7% in purity and a filtrate which was then treated similarly as described in Example 2 to obtain resorcinol of 98% in purity.

EXAMPLE 8

A mixture containing 400 g of resorcinol, 400 g of hydroquinone and 50 g of high-boiling tarry matters, and 1600 g of acrylonitrile were distilled similarly as mentioned above in intimate contact with vapours of the two. The distillate thus obtained was cooled to 10°C and the resulting slurry was separated by filtration into 395 g of crystals and 1960 g of a filtrate. The crystals obtained contained resorcinol and hydroquinone in a weight ratio of 5:95, and the ratio of the filtrate was 95:5.

For the purpose of comparison, the experimental results obtained with a solvent other than those of the present invention which dissolves resorcinol very well and hydroquinone sparingly, for example water and benzene, will be illustrated with the following reference examples.

REFERENCE EXAMPLE 1

Resorcinol and hydroquinone were dissolved in 100 g-moles of water at 20°C in amounts of 18.65 g-moles and 1.16 g-moles respectively. As can be seen from these, resorcinol is dissolved in water at 20°C about 16 times more than hydroquinone, and so it seems possible to separate the two from each other based on the solubility difference between the two. However it was found that, when a mixture containing 50% of resorcinol and 50% of hydroquinone was heated together with the same amount of water, cooled and separated at 20°C into crystals and a filtrate by filtration, the ratios of resorcinol to hydroquinone were 25:75 and 75:25 in the crystals and the filtrate respectively. The same procedure was further tried on the filtrate to increase a resorcinol content, however the ratio of the second filtrate was found about 82:18. This seems to be the composition of a resorcinol-hydroquinone-water ternary system at an eutectic point thereof, and so how many times the procedure is repeated, the resulting crystals and filtrates will not have any ratio other than 82:18.

As can be seen from the above, the separation of resorcinol from hydroquinone is seemingly very simple from the solubilities of the two, however it is not practically so easy.

REFERENCE EXAMPLE 2

Resorcinol and hydroquinone were dissolved in 100 g-moles of benzene at 100°C in amounts of 79.8 g-moles and 1.2 g-moles respectively.

To a mixture containing 50% resorcinol and 50% of hydroquinone was added the same amount of benzene, and the mixture was heated at 100°C in an autoclave and then pressure-filtered.

The filtrate thus obtained contained resorcinol and hydroquinone in a weight ratio of about 80:20, and the same procedures above-mentioned were repeated with the filtrate to increase the resorcinol content, however it was in vain.

This shows that the ratio obtained is the same as obtained by crystallization, and that benzene does not contribute to the separation at all. This example with benzene also shows that the usefulness of solvents for the separation can not be determined by the solubilities alone of resorcinol and hydroquinone each.

What we claim is:

1. A process for the separation of resorcinol and hydroquinone, which comprises forming a slurry by mixing a mixture consisting essentially of resorcinol and hydroquinone with at least one solvent selected from the group consisting of ethyl acetate, methyl benzoate, diethyl isophthalate, acrylonitrile, acrylic acid, methyl acrylate, anisole, methyl anisole, methyl alcohol, ethyl alcohol, tetrahydrofuran and dioxane, at a temperature of −20°C to 110°C, the amount of said solvent being one-tenth to 30 times by weight, based on said mixture of resorcinol and hydroquinone or said mixture in said solvent to form a solution by heating and then cooling to a temperature of −20°C to 110°C to form said slurry and separating the resulting slurry into crystals containing a predominant amount of hydroquinone and a solution containing a predominant amount of resorcinol.

2. A process according to claim 1, wherein the crystals containing a predominant amount of hydroquinone are further purified by treating according to the method of claim 1 with at least one solvent selected from the group consisting of water, acetone, methylethylketone, methylisobutylketone and the solvents defined in claim 1.

3. A process according to claim 1, wherein the solution containing a predominant amount of resorcinol is further purified after the solvent has been evaporated off, by crystallization from at least one solvent selected from the group consisting of water, acetone, methylethylketone, methylisobutylketone and the solvents defined in claim 1 according to the process of claim 1.

4. A process according to claim 1, wherein the solution containing a predominant amount of resorcinol is further purified after the solvent has been evaporated off, by treating with at least one solvent selected from the group of those solvents recited in claim 1 at a different solvent ratio and treating temperature than that utilized previously.

5. A process for the separation of resorcinol and hydroquinone, which comprises mixing vapors of a mixture consisting essentially of resorcinol and hydroquinone with the vapor of at least one solvent selected from the group consisting of ethyl acetate, methyl benzoate, diethyl isophthalate, acrylonitrile, acrylic acid, methyl acrylate, anisole, methylanisole, methyl alcohol, ethyl alcohol, tetrahydrofuran and dioxane, said mixing taking place in the gaseous phase, cooling to liquify the vapors and then to form a slurry and separating the resulting slurry into crystals containing a predominant amount of hydroquinone and a solution containing a predominant amount of resorcinol.

* * * * *